Jan. 19, 1971 F. A. BEZLA J Re. 27,034

LADING SEPARATING APPARATUS

Original Filed Sept. 20, 1965

INVENTOR
FRANK A. BEZLAJ

BY Blair Freeman & Molinare
Attys.

United States Patent Office

Re. 27,034
Reissued Jan. 19, 1971

27,034
LADING SEPARATING APPARATUS

Frank A. Bezlaj, Western Springs, Ill., assignor to Unarco Industries, Inc., a corporation of Illinois Original No. 3,352,595, dated Nov. 14, 1967, Ser. No. 488,601, Sept. 20, 1965. Application for reissue July 25, 1969, Ser. No. 858,900
Int. Cl. B60p 7/14
U.S. Cl. 296—24 11 Claims

**Matter enclosed in heavy brackets [ ] appears in the original patent but forms no part of this reissue specification; *matter printed in italics indicates the additions* made by reissue.**

ABSTRACT OF THE DISCLOSURE

A lading separating means for storage spaces in railroad cars, trailers and the like is provided having vertically spaced horizontal tracks on the side walls of the compartments and including panels positioned between opposed walls of the compartment and having spaced pins at the ends of the panels to both support and latch the panels in the tracks. An arrangement of tracks and panels provides that the panels are mountable horizontally or vertically.

This invention relates to lading separating apparatus and more particularly to apparatus for effectively compartmentizing a lading space such as the space within a vehicle body.

In packing lading of various types in trucks, trailers and railroad cars for transport as well as for storage in static spaces, it has become a common practice to divide the space by movable partitions or panels which may be latched in various selected positions within the space. Separators of this type are usually relatively heavy and expensive and require the installation of heavy and expensive tracks on which the dividers are permanently and movably supported within the body. Such apparatus is therefore not well adapted for use in vehicles such as trucks or trailers. Furthermore, while such apparatus effectively separates the body lading space horizontally, it does not lend itself to compartmentizing the space horizontally and vertically as is desirable for the handling of many types of commodities.

It is accordingly an object of the present invention to provide lading separating apparatus having a high degree of flexibility in dividing the space both horizontally and vertically and which is suitable for use in highway vehicles as well as in railroad cars.

Another object is to provide lading separating apparatus which is capable of separating the lading space into compartments of different sizes and shapes spaced both vertically and horizontally.

According to a feature of the invention, panels are individually freely movable into and out of the body and carry follower members which are movable from a retracted position within the panels to an extended position in which they are slidably supported on horizontally extended tracks in the body. The panels may be positioned either vertically or horizontally, may be of different sizes and may be latched in a plurality of different positions in the body.

According to another feature of the invention, the body carries a plurality of vertically spaced horizontal channel shaped tracks on each side and the panels carry retractable pins which fit into the tracks to support the panels thereon for sliding or turning movement. Preferably the tracks are formed with latching openings in their webs to receive the pins carried by the panels thereby to latch the panels within the body. The tracks are preferably recessed into the body of the vehicle, thereby not reducing the inside width of the body.

The above and other objects and features of the invention will be more readily apparent from the following description when read in connection with the accompanying drawing in which.

Figure 1:
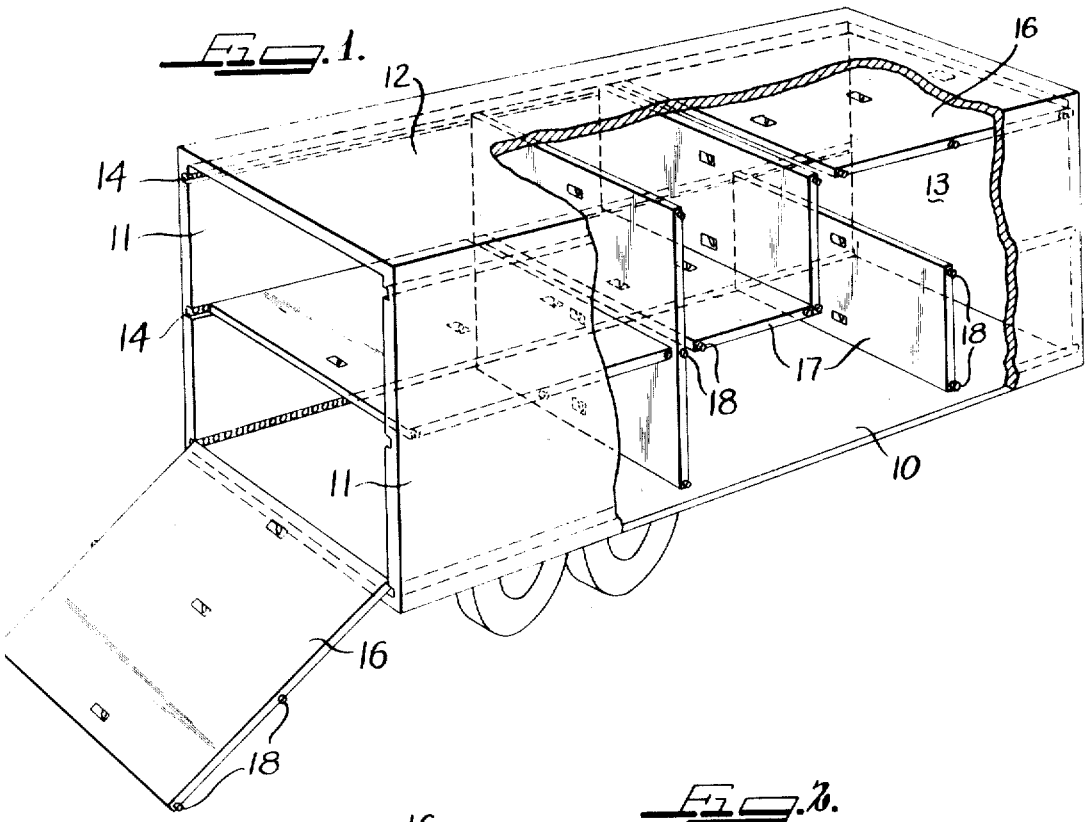
FIGURE 1 is a perspective view with parts broken away of a vehicle equipped with lading separating means embodying the invention.
Figure 2:
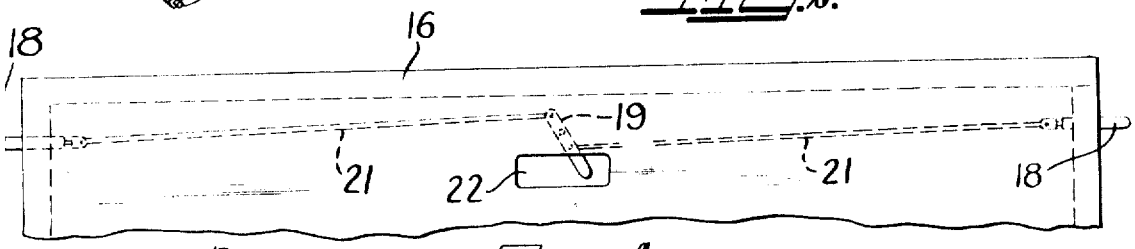
FIGURE 2 is a partial face view of one of the panels.

As illustrated in FIGURE 1 the invention is applied to a conventional highway trailer having a generally rectangular body comprising a floor 10, sidewalls 11 and a roof 12. The body is closed at its forward end by an end wall 13 and may be provided at its open rear end with conventional closure doors, although in many cases such doors may be omitted. It will be understood, of course, that any other type of freight receiving body, such as a truck, railroad car or stationary storage space, could be equipped with the lading separating apparatus of the invention as well as the trailer body illustrated.

Each of the sidewalls 11 is provided with a plurality of horizontally extending tracks, three such tracks being shown for purposes of illustration. As best seen in FIGURES 3 to 6, each of the tracks comprises a channel shaped strip 14 recessed into the body sidewall with the channel opening horizontally toward the interior of the body. Each strip 14 is formed in its base or web with a series of spaced latching openings 15 which register with corresponding spaces in the sidewall of the body so that latching pins can extend through the opening.

The body space is adapted to be divided into compartments by a series of panels which can be inserted in the body in different selected positions and can be latched in such positions. As shown, two different types of panels are provided, one type of which, illustrated at 16, is of a size substantially to close the body space when set in a vertical position therein. The other type, as illustrated at 17, is of approximately half width to span approximately half of the vertical space in the body and to extend between two adjacent tracks.

Figure 3:
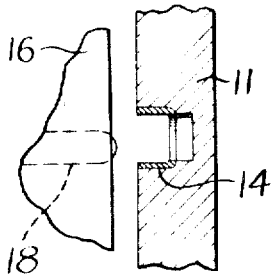
FIGURES 3, 4 and 5 are partial sectional views through the vehicle side wall showing different positions of the panel supporting and latching pins with relation to the tracks.
Figure 4:
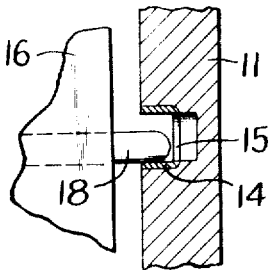
Figure 5:
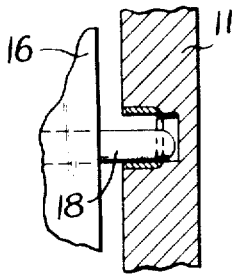
Figure 6:
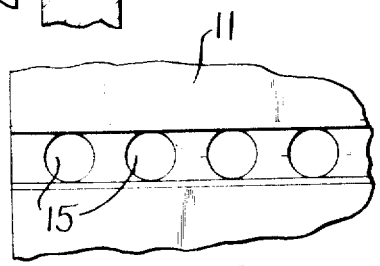
FIGURE 6 is a partial elevation of the body wall showing the construction of a track therein.

The panels 16 slidably carry at their opposite vertical edges three sets of pins 18 which may be moved to a retracted position within the panel, as shown in FIGURE 3, or to a partially extended position projecting beyond the panel edge, as shown in FIGURE 4, or to a fully extended position, as shown in FIGURE 5. To operate the pins each panel is provided in registry with each horizontally aligned pair of pins with an operating lever 19 pivoted intermediate its ends to the panel and connected on opposite sides of its pivot through links 21 to the respective pins. Preferably the panels are hollow with the links extending between the walls thereof and with the operating levers lying between the walls. One or both faces of the panels may be formed with openings 22 through which the ends of the levers 19 are accessible for manual operation. Each of the panels 16 as shown is provided with three pairs of pins 18 spaced to correspond to the spacing of the tracks 14. Each of the shorter panels 17 is provided only at its upper and lower edges with pairs of pins 18 which will register with adjacent tracks 14.

For using the lading separating apparatus, the pins may be moved to their retracted position, as shown in FIGURE 3, and the panels may be inserted in the body. When a panel is to be installed in a vertical position it may be placed vertically and the pins may then be extended to their intermediate position, as shown in FIGURE 4, in which they will enter the channel tracks 14 and support the panel from the tracks. With the pins so extended the panel may be slid to any desired position within the body and the pins may then be further extended to the position shown in FIGURE 5 to enter the latching opening 15 in the tracks thereby to latch the panel securely in the selected position. It will be seen that not all of the pins on any one panel need be extended since any one pair of the pins will support the panel for sliding movement. It will further be apparent that when only one set of pins is extended the panel can be swung about the horizontal axis defined by that set of pins to a horizontal position in which all of the pins at each side thereof fit into the same track. When in horizontal position the panel may serve as a pallet to support lading in the body. In this way the panel can be used to divide the body either horizontally or vertically, as shown in FIGURE 1. Also, for storage to provide minimum interference with the lading space, the panels can be placed in horizontal position in the upper pair of tracks as shown at the right of FIGURE 1.

The shorter panels 17 may be located in the body in any desired positions to form compartments of different sizes and shapes. These panels also can be positioned either horizontally or vertically and can serve to divide the body into relatively small compartments. One typical arrangement which might be desirable for various types of lading is illustrated in FIGURE 1.

It will thus be seen that by the present invention an extremely high degree of flexibility in separation of a lading space is made possible with a relatively simple and light weight type of equipment. While one embodiment of the invention has been shown and described in detail it will be understood that this is illustrative only and is not to be taken as a definition of the scope of the invention, reference being had for this purpose to the appended claims.

What is claimed is:

1. Lading separating apparatus in combination with a generally rectangular body adapted to receive lading comprising a plurality of vertically spaced parallel tracks extending along the sidewalls of the body, the tracks being inwardly opening channels, a panel of a length substantially to span the space between the sidewalls, follower members movably carried by the panel and movable to one position in which they clear the tracks and to a second position in which they engage the tracks to support the panel for sliding movement therealong, the followers being pins slidably carried by the panel and adapted to project beyond the ends of the panel to fit slidably in the channels, and cooperating latch means on the panel and the body to latch the panel in any one of a plurality of selected positions in the body, the latch means comprising a plurality of spaced openings in the webs of each channel and the follower pins being movable to a third position in which they engage the openings.

2. The lading separating apparatus of claim 1 in which the follower members are in pairs with the members of each pair being at opposite ends of the panel to engage tracks on opposite sidewalls of the body respectively and including operating means for separately moving the follower members of different pairs.

3. Lading separating apparatus as set forth in claim 1 wherein the tracks are in the form of channel strips carried by the body's sidewalls and facing inwardly of the wall.

4. Lading separating apparatus as set forth in claim 1 wherein the panel is of a width substantially equal to the vertical spacing between a pair of spaced parallel tracks.

5. Lading separating apparatus as set forth in claim 1 wherein at least two follower members are provided at each end of the panel, and said follower members at each end of the panel are spaced a distance equal to the vertical distance between a pair of parallel tracks, whereby said follower members may support the panel in a vertical position spanning a pair of tracks or alternatively in a horizontal position on a single track.

6. Lading separating apparatus as set forth in claim 1 wherein the tracks are recesses in the side walls of the body.

7. Lading separating apparatus comprising, in combination with a generally rectangular body adapted to receive lading, at least three vertically spaced horizontal tracks on each side of the body, the tracks being inwardly opening channels, a panel of a length to span the body from side to side, a plurality of follower members corresponding in spacing to the spacing of tracks on each side of the body carried by the panel at each of its ends, means movably mounting the follower members on the panel for movement from an extended position in which they engage the tracks for longitudinal movement therealong to a retracted position in which they clear the tracks, the follower members being pins slidably carried by the panel, and latching means to latch the panel in any one of a plurality of positions in the body, the latching means including a plurality of spaced openings in the web of each channel, and the follower members being extendable to a latching position in which they enter selected ones of the spaced openings.

8. Lading separating apparatus comprising, in combination with a generally rectangular body adapted to receive lading, a plurality of vertically spaced, horizontally elongated, continuous track means on each side of the body, each track means including a lower elongated surface and an upper elongated surface parallel to and spaced above said lower surface, a panel of a length to span the body from side to side and inwardly of said surfaces of the track means and of a width to extend from one of the track means to another when the panel is in a vertical position, a pair of pins extending from each end of the panel adjacent to the edges thereof and spaced a distance equal to the distance between two of the vertically spaced track means to permit such pins simultaneously to engage two of the track means when the panel is in a vertical position, said pins at each end of the panel being guidably positioned between the spaced surfaces of the track means and engageable with and slidable along the lower elongated surface of the same track means to support the panel in a horizontal position, and latching means on the track means cooperating with the pins to latch the panel against movement along the track means.

9. Lading separating apparatus comprising, in combination with a generally rectangular body adapted to receive lading, at least three vertically spaced horizontal tracks on each side of the body, a panel of a length to span the body from side to side, a plurality of follower members corresponding in spacing to the tracks on each side of the body carried by the panel at each of its ends, means movably mounting the follower members on the panel for movement from an extended position in which they engage the tracks for longitudinal movement therealong to a retracted position in which they clear the tracks, and latching means to latch the panel in any one of a plurality of positions in the body, there being a plurality of panels some of which extend the full height of the body and have at least three follower members at each end of the body and others of which are of less height and have a smaller number of follower members.

*10. Lading separating apparatus comprising, in combination: an elongated body of generally rectangular cross-section adapted to receive lading therein, a plurality of vertically-spaced, parallel, horizontal track means along opposite longitudinal sides of the body, a panel of a length to substantially span the body between said sides, a plurality of elongated track-engaging members carried by the panel, in a manner so as to be non-pivotable about*

*their respective longitudinal axes, and extending outwardly of opposite ends of the panel for engagement with said track means, the track-engaging members cooperating with the track means to provide the same character of engagement therebetween regardless of whether the panel is at a horizontal attitude or at an upright attitude within the body, and the spacing of said track-engaging members at each end of the panel corresponding with the vertical spacing of track means, whereby the panel may be selectively used either at a horizontal attitude as a pallet or at an upright attitude as a bulkhead.*

*11. Lading separating apparatus as in claim 10 including cooperating features on the track means and track-engaging members for maintaining the panel at selected positions longitudinally within the elongated body regardless whether the panel is at a horizontal or upright attitude.*

References Cited

The following references, cited by the Examiner, are of record in the patented file of this patent or the original patent.

UNITED STATES PATENTS

| | | | |
|---|---|---|---|
| 3,070,044 | 12/1962 | Tobin | 105—369 |
| 3,227,102 | 1/1966 | Shook | 105—369 |

PHILIP GOODMAN, Primary Examiner

U.S. Cl. X.R.

105—369, 376; 280—179